United States Patent [19]

Zondler et al.

[11] 4,201,854

[45] May 6, 1980

[54] CURABLE EPOXIDE RESIN MIXTURES

[75] Inventors: Helmut Zondler, Bottmingen; Hans Lehmann, Aesch, both of Switzerland

[73] Assignee: Ciba-Geigy Corporation, Ardsley, N.Y.

[21] Appl. No.: 946,488

[22] Filed: Sep. 28, 1978

[30] Foreign Application Priority Data

Oct. 20, 1977 [CH] Switzerland ............... 12792/77

[51] Int. Cl.$^2$ ............... C08G 59/50; C08G 59/54
[52] U.S. Cl. ............... 528/121; 260/465.5 R; 260/563 R; 260/566 R; 260/576; 528/93; 528/122; 528/103; 528/123; 528/124; 528/341; 528/361; 528/407; 528/408; 525/507
[58] Field of Search ............... 528/93, 121, 122, 123, 528/124, 135, 341, 361, 407, 408, 103

[56] References Cited

U.S. PATENT DOCUMENTS

| | | | |
|---|---|---|---|
| 2,642,412 | 6/1953 | Newey et al. | 260/47 |
| 3,385,809 | 5/1968 | Wiltgen et al. | 260/18 |
| 3,442,856 | 5/1969 | Floyd | 260/47 |
| 3,519,602 | 7/1970 | Castro et al. | 260/47 |

*Primary Examiner*—Earl A. Nielsen
*Attorney, Agent, or Firm*—Joseph F. DiPrima

[57] ABSTRACT

Curable mixtures of polyepoxide compounds which contain an amine curing agent have longer curing times, and thus, in particular, good workability when used as adhesives, when N,N-dimethylethylenediamine derivatives or N,N-dimethyl-1,3-propylenediamine derivatives are used as the curing agents. The mechanical properties are also frequently improved.

14 Claims, No Drawings

CURABLE EPOXIDE RESIN MIXTURES

The present invention relates to curable mixtures of polyepoxide compounds, which contain an amine as the curing agent.

Epoxide resins are widely used in diverse technical fields, for example for surface protection, in the electrical and construction industries and as adhesives, laminating materials and tooling resins. In addition to various conventional additives, the epoxide resins contain curing agents, the composition of which must be matched, for example, to the processing conditions, the field of application and the product characteristics.

It is known to use N,N-dialkyl-1,3-propylenediamines as curing agents, specifically on their own (German Pat. No. 961,029) or together with "polyamide resins" (Swiss Pat. No. 362,526). Although these 1,3-propylenediamines have proved to be good curing agents, their use is not without disadvantages. On the one hand, they are relatively low-boiling substances which partially vapourise during processing for the production of epoxide resins and lead to not insignificant troublesome odours. These can be eliminated to only an incomplete extent by the use of suction devices. On the other hand, a deposit of carbonate on processing machines due to the moisture and carbon dioxide content of the air is frequently observed.

N,N-Dialkyl-1,3-propylenediamines are still relatively reactive, so that the viscosity range in which the mixture is no longer workable is reached within a short time of mixing the components. This viscosity is generally given by the pot life, which in this case is thus still regarded as being too short, which signifies disadvantages in respect of applied technology.

It has also already been proposed to use N,N-dimethyl-1,3-propylenediamine as the curing agent in those polyepoxide compositions which are used as adhesives. Although very good adhesion is achieved by these means, there is a need to improve the adhesive action in order to be able to extend the field of application.

The object of the present invention is to provide curable mixtures of polyepoxide compounds which contain an amine curing agent, which mixtures have longer pot lives and also an identical or improved adhesive action when used as adhesives. Preferably, the amine curing agents should be less volatile than, for example, N,N-dialkyl-1,3-propylenediamines.

The present invention relates to curable mixtures containing a polyepoxide compound, which has, on average, more than one epoxide group in the molecule, and a curing agent which has the formula I

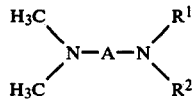

(I)

in which A is ethylene, 1,3-propylene or 1,3-propylene methylated in the 1- or 2-position, $R^1$ is a hydrogen atom and $R^2$ is acyl or a saturated, olefinically unsaturated or arylated hydrocarbon radical of aliphatic or cycloaliphatic character, or $R^2$ is the said hydrocarbon radical and $R^1$ is acyl, or $R^1$ is a hydrogen atom or $R^2$ independently has the meaning defined for $R^2$, and $R^2$ is $A^1$—CN or $A^1$—$CH_2$—$NH_2$, in which $A^1$ is ethylene or ethylene methylated in the 1- or 2-position, or $R^1$ and $R^2$ together are alkylidene, alkenylidene, cycloalkylidene or cycloalkenylidene.

Alkyl and alkenyl $R^2$ preferably contain 1 to 12, especially 1 to 8, and in particular 1 to 4 C atoms, cycloalkyl or cycloalkenyl $R^2$ contains 5 to 8 ring carbon atoms and aralkyl $R^2$ preferably contains 7 to 12 and especially 7 to 9 C atoms. Alkylidene or alkenylidene $R^1$ and $R^2$ can have 2 to 8 C atoms and cycloalkylidene or cycloalkenylidene $R^1$ and $R^2$ can have 5 to 8 ring carbon atoms; acyl $R^2$ and $R^1$ can have 1 to 18, preferably 1 to 9 and especially 1 to 4 C atoms. A is preferably 1,3-propylene and $A^1$ is preferably ethylene.

A preferred sub-group of curing agents comprises those in which, in formula I, $R^1$ is a hydrogen atom and $R^2$ is ethyl, n-propyl, i-propyl, n-butyl, i-butyl, cyclopentyl, cyclohexyl, formyl, acetyl, propionyl, β-cyanoethyl or γ-aminopropyl.

A further preferred sub-group of curing agents comprises those in which, in formula I, $R^1$ and $R^2$ are either β-cyanoethyl or γ-aminopropyl, or those in which $R^1$ and $R^2$ together are i-butylidene, benzylidene or cyclohexylidene.

A particularly valuable group is that in which, in formula I, A is ethylene and especially 1,3-propylene, $R^1$ is a hydrogen atom and $R^2$ is β-cyanoethyl, aminopropyl or acyl having 1 to 7 C atoms.

$R^2$ in formula I can be alkyl or alkenyl, cycloalkenyl or cycloalkyl. Examples of such radicals are: methyl, ethyl, propyl, i-propyl, n-, i- and t-butyl, pentyl, hexyl, heptyl, octyl, nonyl, decyl, undecyl, dodecyl, cyclopentyl, cyclohexyl, cycloheptyl, cyclooctyl, ethenyl, propenyl, butenyl, hexenyl and cyclohexenyl. Aralkyl $R^1$ or $R^2$ is in particular benzyl. Further examples are α- or β-phenylethyl and phenylpropyl. The lower alkyl radicals up to butyl, cyclohexyl and benzyl are particularly preferred.

$R^1$ and $R^2$ together can be alkylidene, cycloalkylidene, alkenylidene, cycloalkenylidene and alkylene. Examples of such radicals are: ethylidene, n- or i-propylidene, n- or i-butylidene, pentylidene, hexylidene, heptylidene, octylidene, cyclopentylidene, cyclohexylidene, cyclooctylidene, benzylidene, diphenylmethylidene, penta- and tetra-methylene and propenylidene, butenylidene, hexenylidene and cyclohexenylidene. i-Butylidene, cyclohexylidene and benzylidene are particularly preferred.

Acyl $R^2$ can be, for example: formyl, acetyl, propionyl, n- or i-butyroyl, n- or i-valeroyl, caproyl, benzoyl, phenylacetyl and α- or β-phenylpropionyl. Particularly preferred radicals are those lower acyl radicals which have up to 4 C atoms and benzoyl. The acyl radicals can also be substituted by OH or $NH_2$ groups. Examples are hydroxy- or amino-valeroyl, hydroxy- or amino-caproyl and hydroxybenzoyl.

Those compounds of the formula I in which A is 1,3-propylene methylated in the 1- or 2-position are novel. When used according to the invention, these compounds are distinguished by particularly long pot lives. Nevertheless, uniform complete curing of the mixtures at higher temperatures, for example above 100° C., is possible.

Some examples of curing agents of the formula I are: N,N-dimethyl-N'-(β-cyanoethyl)-ethylenediamine, N,N-dimethyl-N'-(γ-aminopropyl)-ethylenediamine, N,N-dimethyl-N'-i-butylethylenediamine, N,N-dimethyl-N'-cyclohexylethylenediamine, N,N-dimethyl-N'-butylidene-ethylenediamine, N,N-dimethyl-N'-cyclohexylidene-ethylenediamine, N,N-dimethyl-N'- formyl-ethylenediamine, N,N-dimethyl-N',N'-dibutyl-ethylenediamine, N,N-dimethyl-N',N'-di-(β-cyanoethyl)-ethylenediamine, N,N-dimethyl-N',N'-di-(γ-amino-propyl)-ethylenediamine, N,N-dimethyl-N'-(β-cyanoethyl)-1,3-diaminobutane, N,N-dimethyl-N'-(γ-aminopropyl)-1,3-diaminobutane, N,N-dimethyl-N'-(γ-aminobutyl)-1,3-diaminopropane, N,N-dimethyl-N'-(β-cyanopropyl)-1,3-diaminopropane, N,N-dimethyl-N'-(β-cyanopropyl)-ethylenediamine, N,N-dimethyl-N'-(γ-aminobutyl)-ethylenediamine, N,N-dimethyl-N'-isobutylidene-1,3-diaminopropane, N,N-dimethyl-N'-benzylidene-1,3-diaminopropane, N,N-dimethyl-N'-cyclohexylidene-1,3-diaminopropane, N,N-dimethyl-N'-isobutyl-1,3-diaminopropane, N,N-dimethyl-N'-benzyl-1,3-diaminopropane, N,N-dimethyl-N'-cyclohexyl-1,3-diaminopropane, N,N-dimethyl-N'-formyl-1,3-diaminopropane, N,N-dimethyl-N'-butyroyl-1,3-diaminopropane, N,N-dimethyl-N',N'-di-(β-cyanoethyl)-1,3-diaminopropane, N,N-dimethyl-N'-di-(γ-aminopropyl)-1,3-diaminopropane, N,N-dimethyl-N',N'-diethyl-1,3-diaminopropane, N,N-dimethyl-N'-(γ-aminopropyl)-1,3-diaminopropane, N,N-dimethyl-N'-(β-cyanoethyl)-1,3-diaminopropane, N,N-dimethyl-N'-butylidene-1-methyl-1,3-diaminopropane, N,N-dimethyl-N'-propionyl-2-methyl-1,3-diaminopropane, N,N-dimethyl-N'-(β-cyanopropyl)-2-methyl-1,3-diaminopropane, N,N-dimethyl-N'-(octadecanoyl)-1-methyl-1,3-diaminopropane and N,N-dimethyl-N'-propionyl-N'-methyl-1,3-diaminopropane.

N,N-Dimethyl-N'-(γ-aminopropyl)-1,3-diaminopropane and N,N-dimethyl-N'-(β-cyanoethyl)-1,3-diaminopropane are particularly preferred.

The curing agents of the formula I are in some cases known compounds or can be prepared by known processes. In order to prepare those curing agents which contain nitrile groups, the known amines of the formula II

$$(CH_3)_2N-A-NH_2 \quad (II)$$

are advantageously used as the starting materials and these are reacted in a known manner with acrylonitrile, methacrylonitrile or crotonitrile (cf. U.S. Pat. No. 2,937,106). However, corresponding halogenated nitriles can also be used as reactants, for example β-chloropropionitrile or β-bromobutyronitrile. The reactions can be carried out with or without an inert solvent and at temperatures of about 0° to 200° C. When adding on the unsaturated nitriles, acid catalysts or agents which form free radicals are advantageously used in some cases. Depending on the molar ratio of the reactants, which in the case of amine to nitrile can be about 1:1 or 1:2, either the mono- or the bis-addition product is obtained.

The corresponding amines are obtained from the nitriles of the formula I by known catalytic hydrogenation (cf. U.S. Pat. No. 2,937,106).

The azomethines of the formula I are obtained when the amines of the formula II are reacted with aldehydes or ketones and the alkylidene or cycloalkylidene group is introduced, water being formed.

The curing agents of the formula I in which $R^2$ is alkyl, cycloalkyl or aralkyl can be prepared either by catalytic reduction of the azomethines of the formula I with, for example Raney nickel or by reacting the amines of the formula II with halogenoalkanes, halogenocycloalkanes or aralkyl halides, for example the chlorides.

The acyl derivatives of the formula I in which $R^2$ is acyl and $R^1$ is a H atom are obtained in a known manner by acylating the corresponding amines of the formula I or II. Amide-forming carboxylic acid derivatives, for example lower alkylcarboxylic acid esters or carboxylic acid halides, or cyclic esters or amides, such as ε-caprolactone or ε-caprolactam, are advantageously used for the acylation.

The curing agents of the formula I are added to the curable mixtures in amounts of, in general, 0.1 to 30 parts by weight, preferably 0.5 to 20 and in particular 1 to 15 parts by weight, based on the polyepoxide compound present. They can be used on their own or together with other curing agents, in which case they then frequently act as curing accelerators. Examples of known curing agents are acids such as di- and poly-carboxylic acids, carboxylic acid anhydrides, polyhydric alcohols and phenols, polyamides, melamine/formaldehyde and urea/formaldehyde condensates, polyamines, polyisocyanates and phenoplast and aminoplast precondensates. Other suitable curing agents are, for example, polyaminoamides, which are prepared from dimerised or trimerised fatty acids and aliphatic polyamines (cf. Swiss Pat. No. 362,526). When used as curing accelerators or together with other curing agents, an amount of 0.1 to 5 parts by weight, based on the polyepoxide compound, generally suffices.

The curing agents can also be used in the form of liquid adducts, for example with liquid butadiene/nitrile copolymer which contains terminal carboxyl groups. If the curing agents contain active hydrogen atoms bonded to N atoms, the curable mixture preferably contains 1 equivalent of epoxide groups per 0.5 to 1.5 equivalents, especially about 1 equivalent, of these H atoms.

Polyepoxide compounds which can be used in the curable mixtures according to the invention are, in particular, those which contain, on average, more than one glycidyl group, β-methylglycidyl group or 2,3-epoxycyclopentyl group bonded to a hetero-atom (for example sulphur and preferably oxygen or nitrogen); particularly preferred compounds are bis-(2,3-epoxycyclopentyl) ether; di- or poly-glycidyl ethers of polyhydric aliphatic alcohols, such as 1,4-butanediol, or polyalkylene glycols, such as polypropylene glycols; di- or polyglycidyl ethers of cycloaliphatic polyols, such as 2,2-bis-(4-hydroxycyclohexyl)-propane; di- or poly-glycidyl ethers of polyhydric phenols, such as resorcinol, bis-(p-hydroxyphenyl)-methane, 2,2-bis-(p-hydroxyphenyl)-propane (=diomethane), 2,2-bis-(4'-hydroxy-3',5'-dibromophenyl)-propane and 1,1,2,2-tetrakis-(p-hydroxyphenyl)-ethane, or of condensation products of phenols and formaldehyde which are obtained under acid conditions, such as phenol novolacs and cresol novolacs; di- or poly-(β-methylglycidyl) ethers of the abovementioned polyhydric alcohols or polyhydric phenols; polyglycidyl esters of polybasic carboxylic acids, such as phthalic acid, terephthalic acid, $\Delta^4$-tetrahydrophthalic acid and hexahydrophthalic acid; N-glycidyl derivatives of amines, amides and heterocyclic nitrogen bases, such as N,N-diglycidylaniline, N,N-diglycidyltoluidine and N,N,N',N'-tetraglycidyl-bis-(p-aminophenyl)-methane; triglycidyl isocyanurate; N,N'-diglycidylethyleneurea; N,N'-diglycidyl-5,5-dimethylhydantoin and N,N'-diglycidyl-5-isopropyl-hydantoin; and N,N'-diglycidyl-5,5-dimethyl-6-isopropyl-5,6-dihydro-uracil.

If desired, active diluents, for example styrene oxide, butyl glycidyl ether, isooctyl glycidyl ether, phenyl glycidyl ether, cresyl glycidyl ether or glycidyl esters of synthetic, highly branched and in the main tertiary aliphatic monocarboxylic acids ("CARDURA E"), can be added to the polyepoxides in order to lower the viscosity.

Curing of the curable mixtures according to the invention to give mouldings and the like is advantageously carried out in the temperature range of 20° to 160° C. Curing can also be carried out as a two-stage or multi-stage process in a known manner, in which case the first curing stage is carried out at a relatively low temperature and the after-curing is carried out at a higher temperature.

In some cases, it can be desired to shorten the gelling and curing times of the mixtures according to the invention. For this purpose, known accelerators for amine curing, for example mono- or poly-phenols, such as phenol or diomethane, salicylic acid or salts of thiocyanic acid, such as NH$_4$SCN, can be added.

Furthermore, customary modifiers, such as extenders, fillers and reinforcing agents, pigments, dyes, organic solvents, plasticisers, flow control agents, agents for conferring thixotropy, flame retardants, mould release agents, can be added to the curable mixtures, according to the invention, consisting of polyepoxide compounds and a curing agent of the formula I, at any stage prior to final curing.

Examples of extenders, reinforcing agents, fillers and pigments which can be used in the curable mixtures according to the invention are: coal tar, bitumen, liquid coumarone/indene resins, textile fibres, glass fibres, asbestos fibres, boron fibres, carbon fibres, cellulose, polyethylene powders and polypropylene powders; quartz powder; mineral silicates, such as mica, asbestos powder or slate powder; kaolin, aluminium oxide trihydrate, chalk powder, gypsum, antimony trioxide, bentones, silica aerogel ("AEROSIL"), lithopones, barytes, titanium dioxide, carbon black, graphite, oxide colours, such as iron oxide, or metal powders, such as aluminium powder or iron powder.

Examples of organic solvents suitable for modifying the curable mixtures are toluene, xylene, n-propanol, butyl acetate, acetone, methyl ethyl ketone, diacetone alcohol, ethylene glycol monomethyl ether, ethylene glycol monoethyl ether and ethylene glycol monobutyl ether.

Examples of plasticisers which can be used to modify the curable mixtures are dibutyl phthalate, dioctyl phthalate and dinonyl phthalate, tricresyl phosphate, trixylenyl phosphate, diphenoxyethylformal and polypropylene glycols.

Examples of flow control agents which can be added when the curable mixtures are used in particular in surface protection are silicones, liquid acrylic resins, cellulose acetobutyrate, polyvinylbutyral, waxes, stearates and the like (some of which are also used as mould release agents).

Particularly for use in the lacquer field, the polyepoxide compounds can, furthermore, be partially esterified in a known manner with carboxylic acids, such as, in particular, higher unsaturated fatty acids. It is also possible to add other curable synthetic resins, for example phenoplasts or aminoplasts, to such lacquer resin formulations.

The curable mixtures according to the invention can be prepared in a conventional manner with the aid of known mixing equipment (stirrers, kneaders or rolls).

The curable epoxide resin mixtures according to the invention are used, in particular, in the fields of surface protection, electrical engineering, laminating processes and adhesives technology and in the building trade. They can be used in a formulation suited in each case to the particular application, in the unfilled or filled state, if desired in the form of solutions or emulsions, as paints, lacquers, compression moulding compositions, injection moulding formulations, dipping resins, casting resins, impregnating resins and binders and as tooling resins, laminating resins, sealing and filling compositions, flooring compositions and binders for mineral aggregates.

The mixtures according to the invention are preferably used as laminating resins and especially as adhesive resins.

The curing agents used according to the invention are liquid to viscous substances which are of low volatility and vapourise to only a slight extent even during processing of the mixtures according to the invention, so that no troublesome odours arise during this processing. The curable mixtures according to the invention have surprisingly longer pot lives (and thus improved processing possibilities) than those mixtures which contain N,N-dimethyl-1,3-propylenediamine, and give at least as good and in some cases better adhesive powers when used as adhesive resins.

The examples which follow serve to illustrate the invention in more detail:

(A) Preparation examples

EXAMPLE 1:

N,N-Dimethyl-N'-benzylidene-diaminoethane

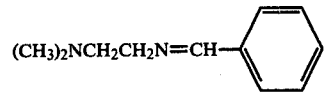

61.6 g of 2-dimethylamino-ethylamine are boiled with 74.2 g of benzaldehyde in 150 ml of benzene under a water separator and 12.3 ml of H$_2$O separate off in the course of 6 hours. Benzene is removed in a rotary evaporator and the residue is distilled.

Yield: 109.2 g (88.5% of theory) of a product which has a boiling point of 130°–132° C./15 mm Hg and according to gas chromatography is a single compound. The NMR spectrum is in accord with the structure.

EXAMPLES 2–6:

Using 3-dimethylamino-1-propylamine and the corresponding aldehydes or ketones as the starting materials, a procedure analogous to that described in Example 1 yields the following imines:

| Example | Imine | Yield | Boiling point |
|---|---|---|---|
| 2 | ⌬—CH=N(CH$_2$)$_3$N(CH$_3$)$_2$ | 96% | — |
| 3 | (CH$_3$)$_2$CHCH=N(CH$_2$)$_3$N(CH$_3$)$_2$ | 81% | 64° C./8 mm Hg |
| 4 | [CH$_3$(CH$_2$)$_4$]$_2$C=N(CH$_2$)$_3$N(CH$_3$)$_2$ | 92% | 148° C./8 mm Hg |

-continued

| Example | Imine | Yield | Boiling point |
|---|---|---|---|
| 5 | 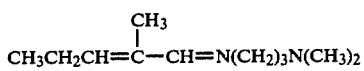 CH=N(CH₂)₃N(CH₃)₂ | 96% | 121° C./13 mm Hg |
| 6 | 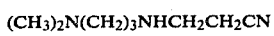 =N(CH₂)₃N(CH₃)₂ | 93% | 116° C./11 mm Hg |

EXAMPLE 7:

N-(γ-Dimethylaminopropyl)-2-methyl-pent-2-enealdimine $$CH_3CH_2CH=\overset{\overset{CH_3}{|}}{C}-CH=N(CH_2)_3N(CH_3)_2$$

41.0 g (0.40 mol) of 3-dimethylamino-1-propylamine and 46.5 g (0.80 mol) of propionaldehyde are boiled in 200 ml of toluene under a water separator; 14.3 ml of H₂O separate off in the course of 11 hours. The mixture is concentrated and the residue is distilled. Yield: 51.9 g (71% of theory); boiling point 113° C./15 mm Hg.

EXAMPLE 8:

N,N-Dimethyl-N'-isobutyl-1,3-diaminopropane (CH₃)₂N(CH₂)₃NHCH₂CH(CH₃)₂

A solution of N,N-dimethyl-N'-isobutylidene-1,3-diaminopropane in benzene is prepared by reacting 92 g of 3-dimethylamino-1-propylamine with 65 g of isobutyraldehyde in 200 ml of benzene by separating off the water of reaction azeotropically. This solution is hydrogenated in an autoclave at 90° C. and 125 atmospheres in the presence of 14 g of Raney nickel. Working up by distillation yields 95.6 g of pure product with a boiling point of 75° C./14 mm Hg.

EXAMPLES 9-12:

Catalytic hydrogenation of the imines according to Examples 2, 5, 6 and 7, after purification by distillation, using Raney nickel, following a procedure analogous to that described in Example 8 yields the following amines:

| Example | Amine | Yield | Boiling point |
|---|---|---|---|
| 9 | —CH₂NH(CH₂)₃N(CH₃)₂ | 96% | 144° C./16 mm Hg |
| 10 | —CH₂NH(CH₂)₃N(CH₃)₂ | 88% | 117° C./9 mm Hg |
| 11 | —NH(CH₂)₃N(CH₃)₂ | 93% | 116° C./13 mm Hg |
| 12 | CH₃CH₂CH₂CHCH₂NH(CH₂)₃N(CH₃)₂<br>            \|<br>           CH₃ | 88%* | 95° C./8 mm Hg |

*Catalyst 5% platinum-on-charcoal; solvent cyclohexane.

EXAMPLE 13:

N-(γ-Dimethylaminopropyl)-3-aminopropionitrile (CH₃)₂N(CH₂)₃NHCH₂CH₂CN 1.6 g of hydroquinone are dissolved in 1,533 g of 3-dimethylamino-1-propylamine and 836 g of acrylonitrile (5% excess) are added dropwise at a temperature of 22°-25° C. in the course of 1½ hours, with stirring and cooling. The mixture is then stirred for a further 15 hours at 22°-25° C. and distilled through a packed column. Yield: 2,102 g (90.3% of theory); boiling point 122° C./10 mm Hg.

EXAMPLE 14:

N-(β-Dimethylaminoethyl)-3-aminopropionitrile (CH₃)₂NCH₂CH₂NHCH₂CH₂CN

The procedure described in Example 13 is repeated using dimethylaminoethylamine and acrylonitrile. Yield: 83% of theory; boiling point 122° C./17 mm Hg.

EXAMPLE 15:

N-(γ-Dimethylaminopropyl)-3-aminobutyronitrile $$(CH_3)_2N(CH_2)_3NH\overset{\overset{CH_3}{|}}{C}HCH_2CN$$

A mixture of 673.5 g of 3-dimethylamino-1-propylamine, 368.4 g of crotonitrile and 20 g of glacial acetic acid is heated to the reflux temperature in the course of 20 minutes, a temperature of 123° C. being attained. The mixture is kept at this temperature for 7 hours; the reaction is not noticeably exothermic. After cooling, the acetic acid is neutralised by adding 70 ml of aqueous 20% sodium hydroxide solution, the mixture is shaken with 2,000 ml of chloroform and the organic phase is then separated off and washed with twice 50 ml of H₂O. After removing the chloroform in a rotary evaporator, the residue is distilled in vacuo. Yield: 93.0%; boiling point 115° C./8 mm Hg. The molecular weight found by titration with 0.1 N HCl is 173 (theory 169); according to gas chromatography the product is a single compound.

EXAMPLE 16:

N-(γ-Dimethylaminopropyl)-3-aminoisobutyronitrile

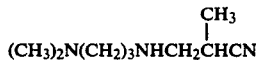
(CH$_3$)$_2$N(CH$_2$)$_3$NHCH$_2$CHCN with CH$_3$ branch 16 ml of concentrated HCl are allowed to drip into 404 g of 3-dimethylamino-1-propylamine and 0.8 g of hydroquinone and the mixture is then heated to 90° C. 279 g of methacrylonitrile are then added in the course of 15 minutes; the reaction is not exothermic. After refluxing for 10 hours, the temperature rises from 99° C. to 125° C. The cooled mixture is dissolved in 500 ml of chloroform and extracted with 2 100 ml portions of H$_2$O. After concentrating, 590.6 g of crude product are obtained and distillation of this product yields 552 g (82.6% of theory) of pure amine with a boiling point of 135° C./17 mm Hg. The NMR spectrum is in accord with the structure.

EXAMPLE 17:

N-(β-Dimethylaminoethyl)-3-aminoisobutyronitrile

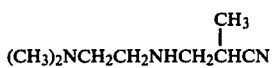
(CH$_3$)$_2$NCH$_2$CH$_2$NHCH$_2$CHCN with CH$_3$ branch

The procedure described in Example 16 is repeated, using 2-dimethylaminoethylamine and methacrylonitrile as the starting materials. Yield: 75.2% of theory of product, which according to gas chromatography is a single compound; boiling point 123° C.17/mm Hg.

EXAMPLE 18:

N-(γ-Dimethylaminopropyl)-1,3-diaminopropane (CH$_3$)$_2$N(CH$_2$)$_3$NH(CH$_2$)$_3$NH$_2$ 216 g of N,N-dimethyl-N'-(β-cyanoethyl)-1,3-diaminopropane are hydrogenated in 216 ml of isopropanol in the presence of 140 g of gaseous ammonia and 13 g of Raney nickel in an autoclave at 120° C. and under an initial pressure of 80 atmospheres until the pressure remains constant, which is already the case after 30 minutes. The catalyst is filtered off with suction, the filtrate is concentrated in a rotary evaporator and the residue is distilled through a packed column. Yield: 205.7 g (92.8%); boiling point 121° C./11 mm Hg.

EXAMPLES 19–21:

Using the corresponding nitriles according to Examples 14, 16 and 17 as the starting materials, catalytic hydrogenation in the presence of Raney nickel under the conditions indicated in Example 18 yields the following amines:

| Ex. | Amine | Yield | Boiling point |
|---|---|---|---|
| 19 | (CH$_3$)$_2$N(CH$_2$)$_2$NH(CH$_2$)$_3$NH$_2$ | 88% | 102° C./17 mm Hg |
| 20 | 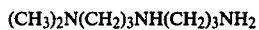 (CH$_3$)$_2$N(CH$_2$)$_3$NHCH$_2$CHCH$_2$NH$_2$ with CH$_3$ branch | 94% | 123° C./17 mm Hg |
| 21 | (CH$_3$)$_2$NCH$_2$CH$_2$NHCH$_2$CHCH$_2$NH$_2$ with CH$_3$ branch | 93% | 108° C./17 mm Hg |

In the IR spectrum, the amines have bands at 3370 and 3300 cm$^{-1}$ (NH$_2$ and NH stretching vibrations; 3300 stronger, since there is superposition); 1600 cm$^{-1}$ broad NH$_2$ deformation vibration. On titration with 0.1 N HCl, three protons add on to the amines; the molecular weights obtained by titration agree well with the calculated values.

EXAMPLE 22:

N-(β-cyanoethyl)-N-(γ-dimethylaminopropyl)-3-aminopropionitrile

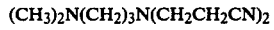
(CH$_3$)$_2$N(CH$_2$)$_3$N(CH$_2$CH$_2$CN)$_2$ 5 ml of concentrated hydrochloric acid are added to 102 g of 3-dimethylamino-1-propylamine, with stirring. The mixture is then heated to 80° C. and 127 g of acrylonitrile are added dropwise at this temperature in the course of 30 minutes, with cooling. The mixture is then heated at 103° C. for 16 hours and, after cooling, a solution of 3 g of NaOH in 100 ml of H$_2$O is added. The resulting mixture is extracted with chloroform, the organic phase is washed with H$_2$O and concentrated in a rotary evaporator and the residue is distilled. Yield: 192 g (92% of theory) of product which according to gas chromatography is a single compound.

EXAMPLE 23:

N-(β-Cyanoethyl)-N-(γ-dimethylaminopropyl)-3-aminobutyronitrile

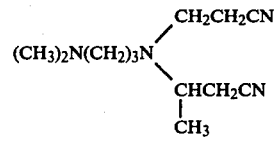

50 ml of concentrated HCl are added to 254 g of N-(γ-dimethylaminopropyl)-3-aminobutyronitrile, prepared in Example 15; the temperature rises to 80° C. during the addition. 95 g of acrylonitrile are then allowed to run in dropwise at this temperature and the mixture is heated at 80°–84° C. for a further 7 hours. After cooling, the hydrochloric acid is neutralised with 130 ml of 20% NaOH solution and the mixture is extracted with chloroform. After washing the organic phase, concentrating and distilling the residue, 250 g (75% of theory) of a product which has a boiling point of 138°–140° C./0.14 mm Hg and according to gas chromatography is a single compound are obtained. On titration with 0.1 N HCl, only one proton is added on, and the molecular weight is found to be 222 (theory 222).

EXAMPLE 24:

N-(β-Cyanoethyl)-N-(γ-dimethylaminopropyl)-3-aminoisobutyronitrile

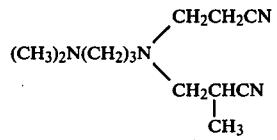

104 g of N-(γ-dimethylaminopropyl)-3-aminoisobutyronitrile, prepared according to Example 16, are heated with 43 g of acrylonitrile in the presence of 30 ml of concentrated HCl in the manner described in Example 23 for 4 hours at 92°–99° C. After neutralising and extracting with chloroform, the extract is distilled.

Yield: 117 g (85% of theory); boiling point 127° C./0.13 mm Hg. Titration with 0.1 N HCl: monoprotonation and molecular weight 223 (theory 222).

EXAMPLE 25:

N-(γ-Aminopropyl)-N-(γ-dimethylaminopropyl)-1,3-diaminopropane

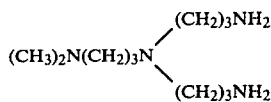

249 g of N-(β-cyanoethyl)-N-(γ-dimethylaminopropyl)-3-aminopropionitrile, prepared according to Example 22, are hydrogenated in 500 ml of ethanol and 150 g of gaseous ammonia in an autoclave in the presence of 25 g of Raney nickel at 110° C. and an initial pressure of 140 atmospheres. The pressure remains constant after only 30 minutes. The catalyst and the solvent are removed and the crude amine is distilled. 169 g of pure amine with a boiling point of 100° C./0.16 mm Hg are obtained. Repeating the distillation of the first runnings yields a further 32.2 g of substance and the total yield is 78%.

EXAMPLE 26:

N3-(γ-Aminopropyl)-N3-(γ-dimethylaminopropyl)-1,3-diaminobutane

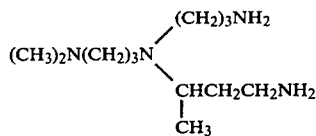

151 g of N-(β-cyanoethyl)-N-(γ-dimethylaminopropyl)-3-aminobutyronitrile, prepared according to Example 23, are hydrogenated in 450 ml of isopropanol in the presence of 150 g of NH3 and 12 g of Raney nickel at 100° C. and an initial pressure of 140 atmospheres for 3 hours until the pressure remains constant. Distillation of the mixture after separating off the catalyst yields 107.6 g (68.7% of theory) of amine with a boiling point of 100° C./0.23 mm Hg. Titration with 0.1 N HCl: three protons added on above pH 3; molecular weight 232 (theory 230).

EXAMPLE 27:

N3-(γ-Aminopropyl)-N3-(γ-dimethylaminopropyl)-2-methyl-1,3-diaminopropane

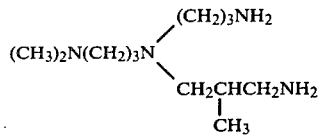

113 g of N-(β-cyanoethyl)-N-(γ-dimethylaminopropyl)-3-aminoisobutyronitrile, prepared according to Example 24, are hydrogenated in 350 ml of isopropanol and 120 g of NH3 in the presence of 9 g of Raney nickel in an autoclave at 100° C. and an initial pressure of 140 atmospheres for 4 hours. Working up by distillation yields 94.6 g (80.5% of theory) of pure product with a boiling point of 96° C./0.17 mm Hg. Titration with 0.1 N HCl: three protons added on above pH 3; molecular weight 234 (calculated 230).

EXAMPLES 28–33:

The following compounds were prepared by acylating 3-dimethylamino-1-propylamine with anhydrides or acid chlorides, by known methods:

| Example | Compound | R | Yield of pure product |
|---|---|---|---|
| 28 | (CH3)2N(CH2)3NHR | —CHO | 97% |
| 29 | (CH3)2N(CH2)3NHR | —COCH3 | 88% |
| 30 | (CH3)2N(CH2)3NHR | —COC2H5 | 94% |
| 31 | (CH3)2N(CH2)3NHR | —CO(CH2)10CH3 | 87% |
| 32 | (CH3)2N(CH2)3NHR | —COCH(CH3)2 | 91% |
| 33 | (CH3)2N(CH2)3NHR | —CO—C6H5 | 96% |

EXAMPLES 34–37

The following compounds were prepared by acylating the secondary amines described in Examples 11, 12, 13 and 15 with methyl formate or propionic anhydride:

| Example | Compound | R | Yield | Boiling point |
|---|---|---|---|---|
| 34 | (CH3)2N(CH2)3N(R)—C6H10H | —COC2H5 | 96% | 103° C./0,12 Torr |
| 35 | (CH3)2N(CH2)3N(R)CH2CH(CH3)CH2CH2CH3 | —CHO | 91% | 147° C./9 Torr |
| 36 | (CH3)2N(CH2)3N(R)CH2CH2CN | —CHO | 72% | 116° C./0,13 Torr |
| 37 | (CH3)2N(CH2)3N(R)CH(CH3)CH2CN | —COC2H5 | 89% | 110° C./0,16 Torr |

EXAMPLES 38 AND 39:

Acylation of the imines according to Examples 3 and 6 with acetic anhydride and, respectively, propionic anhydride yields the following N,N-dimethyl-N'-alkenyl-N'-acyl-1,3-propylenediamines:

| Example | Compound | R | Yield | Boiling point |
|---|---|---|---|---|
| 38 | (CH$_3$)$_2$N(CH$_2$)$_3$NCH=C(CH$_3$)$_2$ with R substituent | —COCH$_3$ | 65% | 68° C./0,12 Torr |
| 39 | (CH$_3$)$_2$N(CH$_2$)$_3$N—⟨phenyl⟩ with R substituent | —COC$_2$H$_5$ | 85% | 97° C./0,12 Torr |

(B) Use examples ide equivalent 188), were used to determine the pot lives and the tensile shear strengths of the cured samples.

Table 1

| Use example No. | Diamine derivative as curing agent | Vapour pressure Diamine derivative (mm Hg/100° C.) | Parts by weight of diamine per 100 parts by weight of epoxide resin | Tecam pot life (100 g/23° C.) hours | Tecam pot life (100 g/23° C.) minutes | Tensile shear strength (N/mm$^2$) after a curing time of 2 days (23° C.) | Tensile shear strength (N/mm$^2$) after a curing time of 20 minutes (100° C.) |
|---|---|---|---|---|---|---|---|
| Comparison | I | 250 | 10 | — | 60 | 2.1 | 14.0 |
| 1 | II | 3 | 10 | 5 | 26 | 6.2 | 10.0 |
| 2 | III | 40 | 10 | 5 | 58 | 4.8 | 14.0 |
| 3 | IV | 5 | 10 | 4 | 13 | 4.3 | 19.0 |
| 4 | V | 6 | 10 | 4 | 44 | 7.6 | 15.1 |
| 5 | VI | 45 | 14 | 2 | 35 | 5.8 | 16.4 |
| 6 | VII | 1.5 | 17 | 2 | 17 | 4.7 | 16.6 |
| 7 | VIII | 5 | 16 | 3 | 0 | 6.0 | 18.1 |
| 8 | IX | 3 | 10 | 3 | 10 | 5.2 | 16.7 |
| 9 | X | 5 | 10 | 5 | 28 | 6.7 | 18.1 |
| 10 | XI | 4 | 10 | 3 | 9 | 6.8 | 16.8 |
| 11 | XII | 3 | 10 | 3 | 10 | 6.4 | 14.6 |
| 12 | XIII | 5 | 10 | 5 | 32 | 6.3 | 18.3 |
| 13 | XIV | 3.5 | 12 | 1 | 5 | 2.5 | 15.6 |
| 14 | XV | 16 | 10 | 1 | 0 | 3.2 | 15.7 |
| 15 | XVI | 5 | 10 | 1 | 15 | 3.0 | 13.2 |
| 16 | XVII | 10 | 10 | 1 | 19 | 2.5 | 13.5 |
| 17 | XVIII | 0.001 | 10 | 4 | 7 | 6.2 | 13.0 |
| 18 | XIX | 3 | 10 | — | 56 | 3.2 | 10.8 |
| 19 | XX | 2 | 11 | 1 | 34 | 1.6 | 17.4 |
| 20 | XXI | 0.6 | 13 | 1 | 50 | 3.5 | 15.7 |
| 21 | XXII | 3 | 12 | 3 | 41 | 0.5 | 23.0 |
| 22 | XXIII | 0.001 | 10 | 4 | 26 | 7.4 | 9.5 |
| 23 | XXIV | 1 | 15 | 2 | 22 | 6.4 | 17.5 |
| 24 | XXV | 0.03 | 19 | 1 | 57 | 1.0 | 16.0 |
| 25 | XXVI | 0.9 | 10 | 7 | 38 | 5.2 | 13.6 |
| 26 | XXVII | 0.1 | 10 | 5 | 10 | 3.1 | 17.4 |
| 27 | XXVIII | 0.9 | 10 | 2 | 50 | 4.0 | 14.7 |
| 28 | XXIX | 0.2 | 12 | 5 | 0 | 3.5 | 15.9 |

The mechanical properties mentioned are determined in the following manner:

The tensile shear strength is determined on ground and degreased Anticorrodal 100-B samples with 12 mm overlap, according to DIN 53 283.

The peel strength is determined on etched aluminium samples, according to ISO 4578.

The short-term stability to heat is measured on tensile shear samples of aluminium (Anticorrodal 100 B) with 12 mm overlap, as follows:

The samples are clamped in an oven and placed under a constant load of 4 N/mm$^2$. The temperature is then raised at a rate of 12° C./hour until the adhesive joint breaks. The break temperatures determined in this way are given in Table 1.

The pot life is determined at 23° C. on 100 g.- or 200 g-samples in a Tecam apparatus. Parts are always by weight.

1. Tests on amine/epoxide mixtures without further additives

The mixtures indicated in Table 1, which consist of 10–20 parts of amine and 100 parts of a liquid epoxide resin based on bisphenol A and epichlorohydrin (epox-

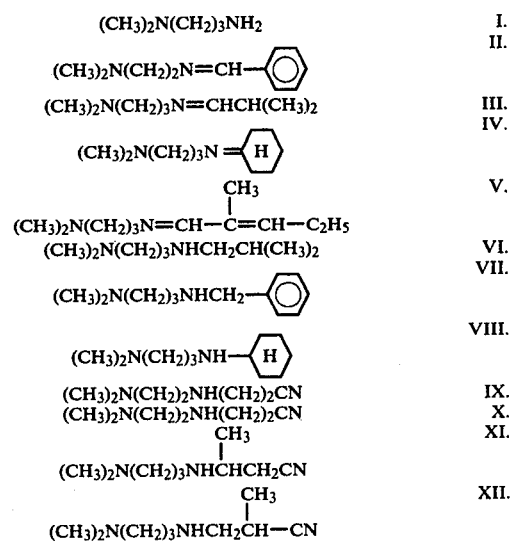

(CH$_3$)$_2$N(CH$_2$)$_3$NH$_2$  I.

(CH$_3$)$_2$N(CH$_2$)$_2$N=CH—⟨phenyl⟩  II.

(CH$_3$)$_2$N(CH$_2$)$_3$N=CHCH(CH$_3$)$_2$  III.

(CH$_3$)$_2$N(CH$_2$)$_3$N=⟨H cyclohexyl⟩  IV.

(CH$_3$)$_2$N(CH$_2$)$_3$N=CH—C(CH$_3$)=CH—C$_2$H$_5$  V.

(CH$_3$)$_2$N(CH$_2$)$_3$NHCH$_2$CH(CH$_3$)$_2$  VI.

(CH$_3$)$_2$N(CH$_2$)$_3$NHCH$_2$—⟨phenyl⟩  VII.

(CH$_3$)$_2$N(CH$_2$)$_3$NH—⟨H cyclohexyl⟩  VIII.

(CH$_3$)$_2$N(CH$_2$)$_2$NH(CH$_2$)$_2$CN  IX.

(CH$_3$)$_2$N(CH$_2$)$_2$NH(CH$_2$)$_2$CN  X.

(CH$_3$)$_2$N(CH$_2$)$_3$NHCHCH$_2$CN with CH$_3$ substituent  XI.

(CH$_3$)$_2$N(CH$_2$)$_3$NHCH$_2$CH—CN with CH$_3$ substituent  XII.

-continued

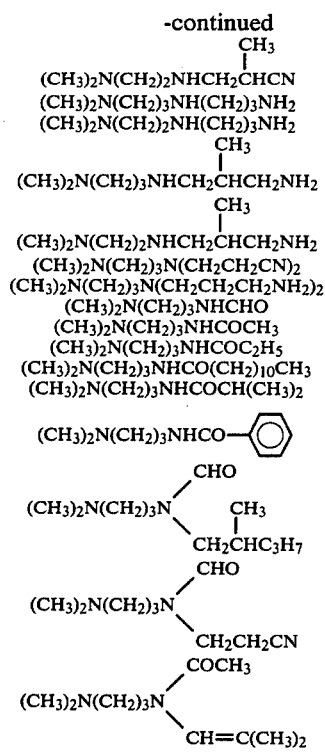

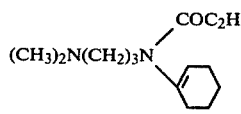

Compared with the comparison example, the mixtures have considerably longer pot lives in some cases; however, they nevertheless cure under the same curing conditions, as is confirmed by the values for the tensile shear strength. The vapour pressures of the pure amines are far below that of dimethylaminopropylamine.

(2) Tests on amine/epoxide mixtures which contain additives.

Mixtures of 100 parts of resin component and 40 parts of curing agent are used to determine the pot lives of the mixtures and the adhesive properties of the cured products.

The resin component consists of 75 parts of liquid epoxide resin based on bisphenol A and epichlorohydrin (epoxide equivalent 188) and 25 parts of lithopone powder. The curing agents are prepared (a) by mixing a polyaminoamide Versamid 125 (Schering) with the diamine derivatives or (b) by mixing a polyaminoamide Versamid 140 (Schering) with the adducts of the diamine derivatives with HYCARCTBN (liquid butadiene/acrylonitrile copolymer with terminal carboxyl groups; manufacturer: Goodrich) which are obtained by a 30 minute treatment at 100°–120° C.

The nature of the amines used in Examples 30–36 and the ratios of the mixtures can be taken from Table 2. Table 3 gives the test results.

All the mixtures in Tables 2 and 3 have pot lives longer than those of the prior art and, after curing, have increased short-term stability to heat and considerably better peel strengths, coupled with approximately equivalent tensile shear strengths.

Table 2

| Application Example No. | Parts of amine | Parts of Versamid Type 125 | Parts of Versamid Type 140 | Parts of resin component* | Parts of HYCAR-CTBN |
|---|---|---|---|---|---|
| Comparison 1 | 7 (CH3)2N(CH2)3NH2 | 33 | — | 100 | — |
| 30 | 7 (CH3)2N(CH2)3NH(CH2)3NH2 | 33 | — | 100 | — |
| 31 | 7 (CH3)2N(CH2)3N(CH2CH2CH2NH2)2 | 33 | — | 100 | — |
| 32 | 9 (CH3)2N(CH2)3NH—⟨H⟩ | 31 | — | 100 | — |
| 33 | 7 (CH3)2N(CH2)3N=CHCH(CH3)2 | 33 | — | 100 | — |
| 34 | 7 (CH3)2N(CH2)3NHCHO | 33 | — | 100 | — |
| Comparison 2 | 8 (CH3)2N(CH2)3NH2 | — | 20 | 100 | 12 |
| 35 | 8 (CH3)2N(CH2)3NHCH2CH2CN | — | 20 | 100 | 12 |
| 36 | 8 (CH3)2N(CH2)3NH(CH2)3NH2 | — | 20 | 100 | 12 |

*Composition:
75 parts of epoxide resin (based on bisphenol A and epichlorohydrin, epoxide equivalent 188) and 25 parts of lithopone powder
Curing conditions:
20 minutes at 100° C.

| Application Example No. | Tensile shear strength; N/mm² | Peel strength; N/mm² | Short-term stability to heat; °C. | Pot life at 23° C. in minutes 100 g amount | Pot life at 23° C. in minutes 200 g amount |
|---|---|---|---|---|---|
| Comparison 1 | 28 | 3.2 | 70 | 74 | 40 |
| 30 | 29 | 4.2 | 72 | 80 | — |
| 31 | 29 | 6.0 | — | — | 75 |
| 32 | 26 | 5.7 | — | — | 120 |
| 33 | 28 | 4.3 | — | — | 115 |
| 34 | 26 | 5.6 | — | — | 70 |
| Comparison 2 | 30 | 6.0 | 80 | 80 | — |
| 35 | 30 | 6.4 | 78 | 260 | — |
| 36 | 31 | 6.1 | 82 | 95 | — |

What is claimed is:

1. A curable mixture comprising:
(a) a polyepoxide compound having an average of more than one epoxide group per molecule; and (b) a curing agent of the formula

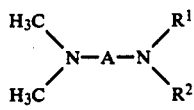

wherein A is

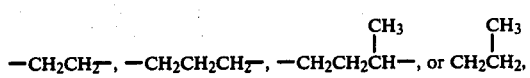

R¹ is hydrogen, acyl or a group of the formula A'CN or A'CH₂NH₂ where A' is

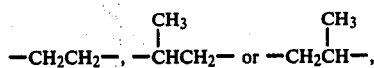

or together with R² is alkylidene, alkenylidene, cycloalkylidene or cycloalkenylidene, R² is a saturated or olefinically unsaturated aliphatic radical, a saturated or olefinically unsaturated cycloaliphatic radical or said aliphatic or cycloaliphatic radical substituted with an aryl group, or a group of the formula A'CN or A'CH₂CN.

2. A curable mixture according to claim 1, wherein R² is alkyl, alkenyl, cycloalkyl, cycloalkenyl or aralkyl.

3. A curable mixture according to claim 1, wherein A is —CH₂CH₂— or —CH₂CH₂CH₂— and R², is alkyl, cycloalkyl or aralkyl, or R¹ and R² together are alkylidene or cycloalkylidene.

4. A curable mixture according to claim 1, wherein A is

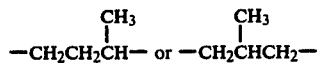

5. A curable mixture according to claim 1, wherein R¹ is hydrogen and R² is alkyl, cycloalkyl or aralkyl.

6. A curable mixture according to claim 3, wherein the alkyl or alkenyl contains 1 to 12, the cycloalkyl or cycloalkenyl contains 5 to 8 ring carbon atoms, the aralkyl contains 7 to 12 C atoms, the alkylidene or alkenylidene contans 2 to 8 C atoms, the cycloalkylidene or cycloalkenylidene contains 5 to 8 ring carbon atoms.

7. A curable mixture according to claim 1, wherein A is —CH₂CH₂— or —CH₂CH₂CH₂—.

8. A curable mixture according to claim 1, wherein A' is —CH₂CH₂—.

9. A curable mixture according to claim 1, wherein R¹ is H and R² is ethyl, n-propyl, isopropyl, n- or isobutyl, cyclopentyl, cyclohexyl, β-cyanoethyl or γ-aminopropyl.

10. A curable mixture according to claim 1, wherein R¹ and R² are either β-cyanoethyl or γ-aminopropyl.

11. A curable mixture according to claim 1, wherein R¹ and R² together are i-butylidene, benzylidene or cyclohexylidene.

12. A curable mixture according to claim 1, wherein A is —CH₂CH₂— or —CH₂CH₂CH₂—, R¹ is hydrogen and R² is β-cyanoethyl or γ-aminopropyl.

13. A curable mixture according to claim 1, which contains 0.1 to 30 and preferably 0.3 to 25 parts of the curing agent based on 100 parts of polyepoxide compound.

14. A curable mixture according to claim 1, wherein the curing agent is selected from the group consisting of the compounds (CH₃)₂N(CH₂)₃NHCH₂CH₂CN, (CH₃)₂N(CH₂)₃NH(CH₂)₃NH₂ or

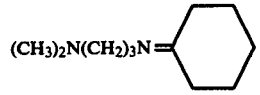

* * * * *